United States Patent
Seiling

(12) United States Patent  (10) Patent No.: US 6,520,314 B1
Seiling (45) Date of Patent: Feb. 18, 2003

(54) APPARATUS FOR ARRANGING PACKAGED BAKERY GOODS FOR SHIPMENT

(76) Inventor: Samuel O. Seiling, 2307 Viking La., Richmond, VA (US) 23228-3838

( * ) Notice: Subject to any disclaimer, the term of this patent is extended or adjusted under 35 U.S.C. 154(b) by 0 days.

(21) Appl. No.: 10/058,719

(22) Filed: Jan. 30, 2002

(51) Int. Cl.$^7$ ............................................... B65G 47/24
(52) U.S. Cl. .............. 198/375; 198/377.01; 198/397.06
(58) Field of Search ............................ 198/375, 377.01, 198/370.03, 370.07, 397.06, 411, 414; 414/757, 782

(56) References Cited

U.S. PATENT DOCUMENTS

| | | | |
|---|---|---|---|
| 2,259,728 A | * 10/1941 | Bridges | 198/375 |
| 2,779,453 A | * 1/1957 | Lippert et al. | 198/375 |
| 3,198,308 A | * 8/1965 | Driesch et al. | 198/397.06 |
| 3,568,864 A | * 3/1971 | Truesdell | 414/757 |
| 3,785,853 A | * 1/1974 | Kirkman et al. | 117/106 |
| 4,522,292 A | 6/1985 | Euverard et al. | |
| 4,579,517 A | * 4/1986 | Biggs | 198/377 |
| 4,832,173 A | * 5/1989 | Hattori | 198/377 |
| 5,317,859 A | * 6/1994 | Schneider et al. | 53/534 |
| 5,538,126 A | * 7/1996 | Rhodes | 198/375 |
| 5,690,209 A | * 11/1997 | Kofoed | 198/370.06 |
| 5,907,529 A | * 5/1999 | Permut | 369/77.2 |
| 6,126,383 A | * 10/2000 | Franklin et al. | 198/374 |
| 6,273,237 B1 | * 8/2001 | Bazydola et al. | 198/375 |
| 6,283,271 B1 | * 9/2001 | Van Den Goor | 198/370.02 |
| 6,378,690 B1 | * 4/2002 | Pessina et al. | 198/414 |

* cited by examiner

Primary Examiner—Douglas Hess
(74) Attorney, Agent, or Firm—Norman Rainer

(57) ABSTRACT

A patterning apparatus for advancing packaged baked goods such as loaves of bread, and positioning the packages for precise loading into delivery containers includes an endless conveyor having a horizontally disposed upper flight and a series of turner assemblies spaced along the conveyor. Each turner assembly, when on the upper flight, receives one or more packages, which rest by gravity effect on the turner assembly. The turner assemblies are adapted to rotate the received package in a horizontal plane while also achieving longitudinal conveyance in the direction of motion of the upper flight, and lateral movement transversely to the longitudinal direction.

20 Claims, 13 Drawing Sheets

APPARATUS FOR ARRANGING PACKAGED BAKERY GOODS FOR SHIPMENT

BACKGROUND OF THE INVENTION

1. Field of the Invention

The present invention relates to apparatus for positioning and advancing packaged baked goods such as loaves of bread, buns, rolls and the like which must be grouped in accurate patterns for loading into delivery containers for transportation to retail outlets.

2. Description of the Prior Art

It is common for baked goods such as loaves of bread, buns and the like to be packaged by placing them into individual plastic bags with the open end of each plastic bag being gathered and having a gripping closure placed there around inwardly of the open end. The terminal portion of the bag outwardly of the closure expands to form a fantail end portion which is generally referred to in the bread packaging art as a "tail."

The packaged bread loaves or other baked goods are generally placed in trays or containers for transportation to retail outlets. The packages are typically arranged in a particular pattern for loading in the container, depending upon the size and shape of the container and the size and shape of the individual packages, so as to place the maximum number of packages in each container without damage to the packages and without having any portion of a package, including the tail, project,beyond the container. The tail extremity of the packages are preferably directed toward the interior of the container.

For this purpose, pattern forming devices are known in the art for arranging individual articles into predetermined patterns and then handling the pattern as a unit for loading into an associated container or the like. Pattern formers designed for handling packaged baked goods are disclosed for example in U.S. Pat. Nos. 3,739,902 and 3,779,363. However, these devices require one or more transfers between moving belts during the pattern forming operation. Such transfers necessarily increase the amount of handling that each package must undergo, thereby increasing the chance of damage to the packaged products.

U.S. Pat. No. 4,522,292 discloses a patterning apparatus which employs a horizontally disposed window belt to orient and advance packages of bakery goods. As the belt undergoes continuous movement, packages supplied from a feeder belt drop through a window on the belt onto an underlying rotatable platform. Entrance and exit gates and a vertically movable positioning frame undergo reciprocating movement each time packages drop through the window. The complex sequence of events attendant package orientation causes the apparatus to have a slow throughput and frequent incidence of malfunction. Although throughput can be increased by causing groups of packages to be supplied by said feeder belt, such grouping diminishes the patterning options of the apparatus.

It is accordingly an object of the present invention to provide a continuous patterning apparatus for arranging packaged bakery goods for shipment.

It is another object of this invention to provide patterning apparatus as in the foregoing object which has a faster throughput than prior patterning apparatus.

It is a further object of the present invention to provide a patterning apparatus of the aforesaid nature capable of handling sequentially supplied single packages.

It is a still further object of this invention to provide a patterning apparatus of the aforesaid nature of simple and durable construction amenable to low cost manufacture.

These objects and other objects and advantages of the invention will be apparent from the following description.

SUMMARY OF THE INVENTION

The above and other beneficial objects and advantages are accomplished in accordance with the present invention by a patterning apparatus for arranging packaged bakery goods for placement into shipping containers, said apparatus comprising:

a) a product orienter comprised of:
 1) conveyor means having a horizontally disposed surface for transporting packages of bakery goods in a longitudinal direction from an entrance site to a discharge site,
 2) a series of turner assemblies associated with said conveyor means for rotating said packages in a horizontal plane while being transported, and
 3) means for causing displacement of said turner assemblies laterally with respect to said longitudinal direction during said transport, and
b) a staging deck which receives oriented packages from said product orienter and assembles them into a predetermined pattern.

The turner assemblies include platform means capable of retaining by gravity effect a packaged bakery product resting thereupon. Said platform means is comprised of an upper layer of a resilient material and a lower layer comprised of an engineering grade polymer such as a nylon polyamide in a sufficiently thin sheet configuration to impart flexibility to said lower layer. Said resilient material is preferably a closed cell sponge rubber as defined in ASTM-D-1056-99, grade 2C2, and having a coefficient of friction interactive with said packaged bakery goods of between 1.0 and 1.2.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
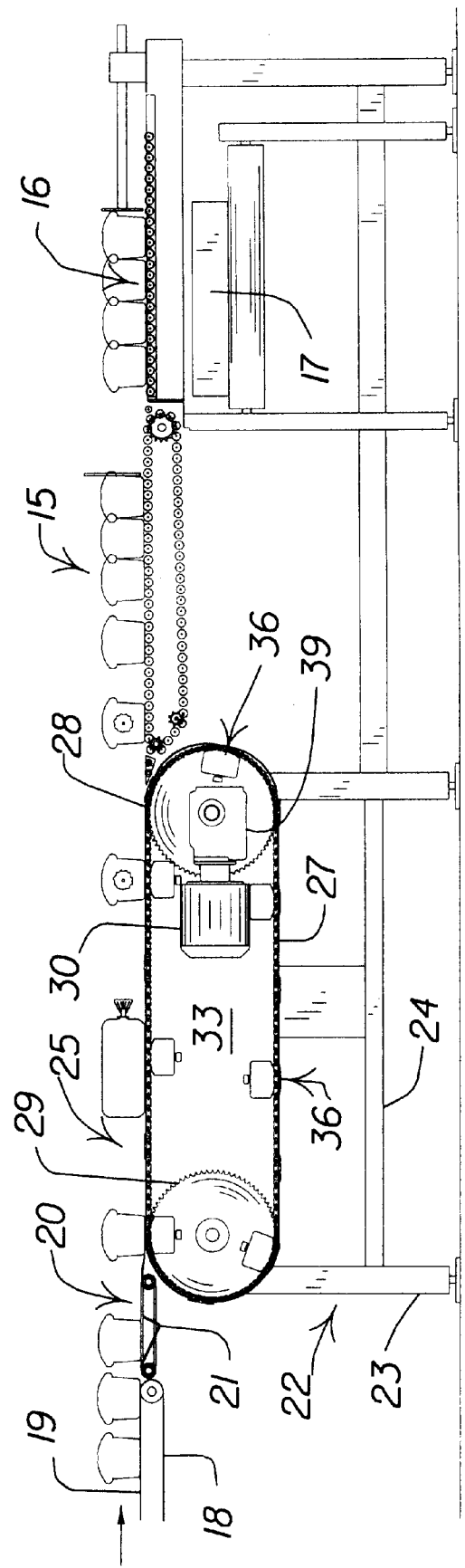
FIG. 1 is a side view of an embodiment of the patterning apparatus of this invention shown in association with packages of bakery goods and conventional.components of equipment for loading said packages into containers for transportation to retail outlets.
Figure 2:
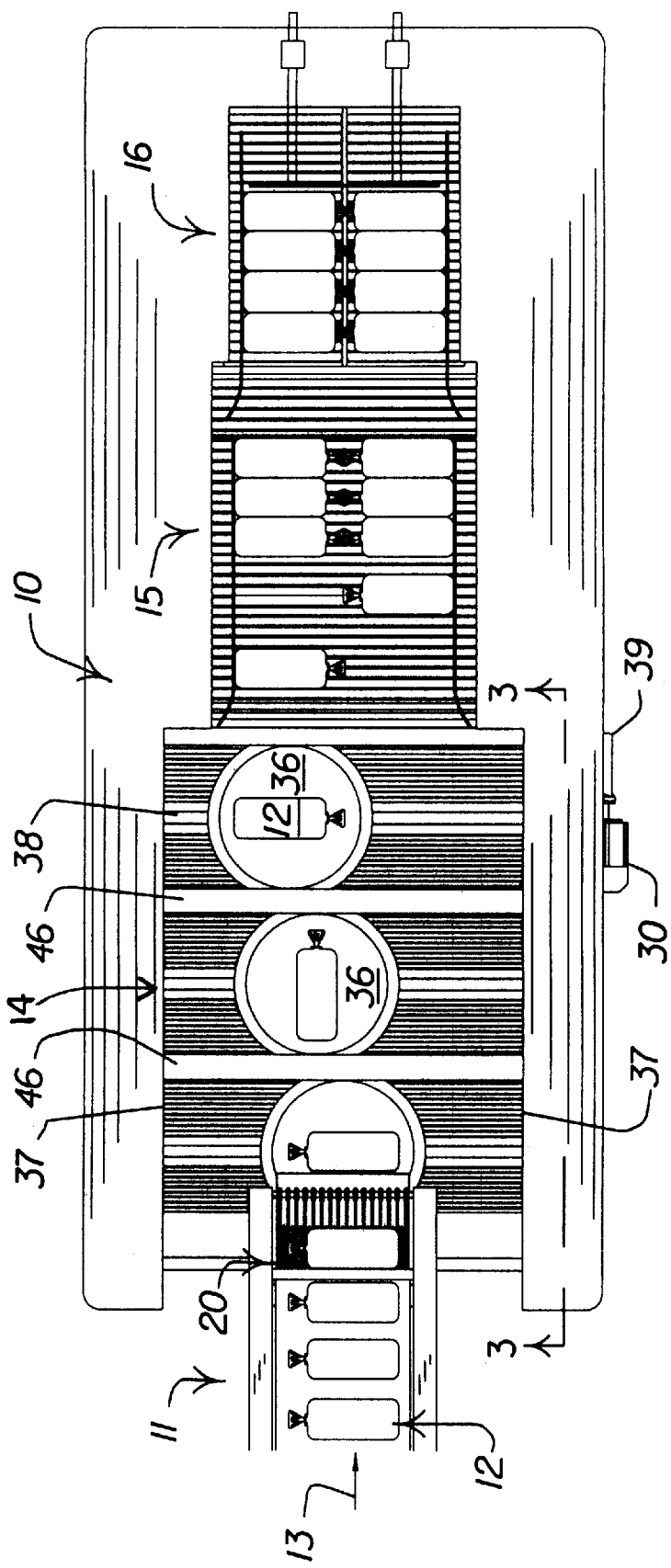
FIG. 2 is a top plan view of the embodiment of FIG. 1.
Figure 3:
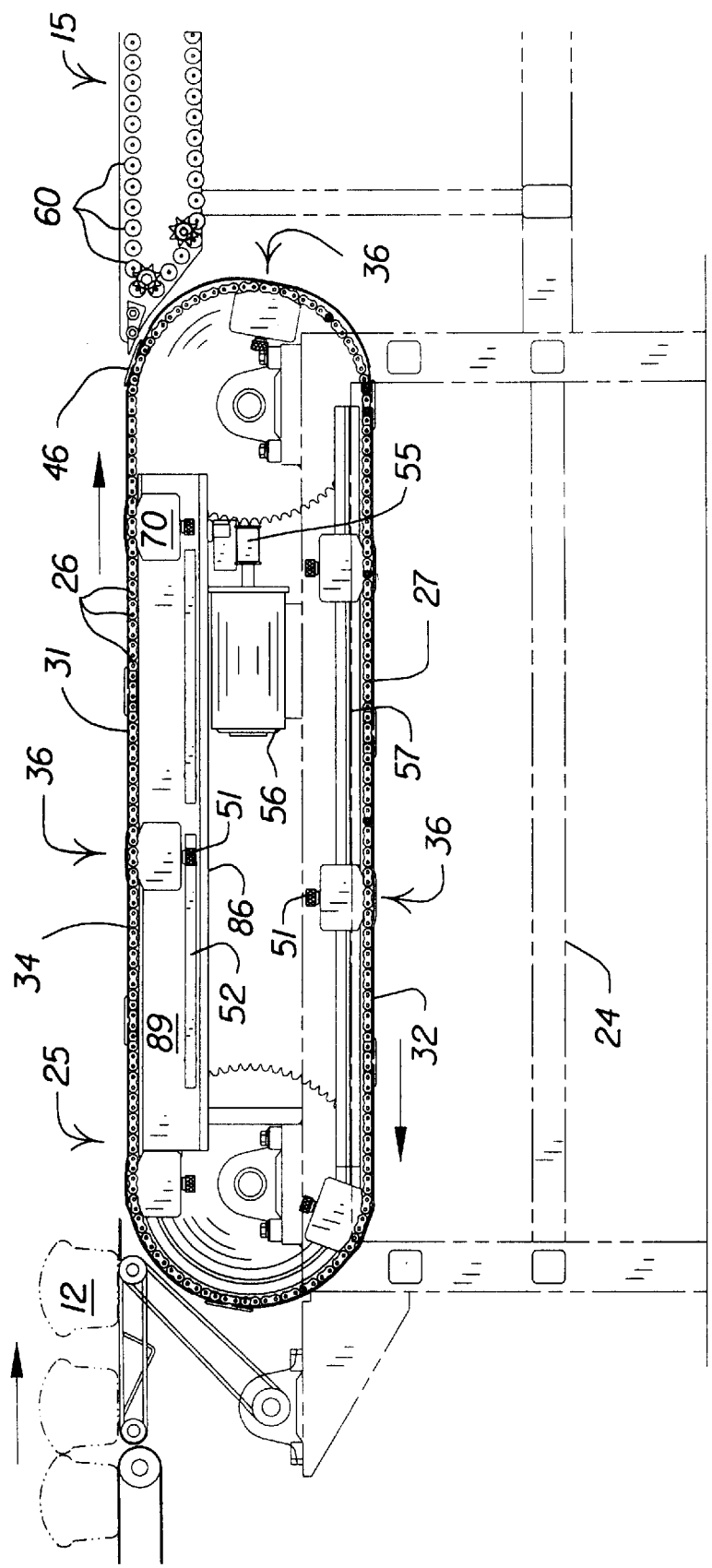
FIG. 3 is an enlarged partial sectional view taken in the direction of the arrows upon the line 3—3 of FIG. 2.
Figure 4:
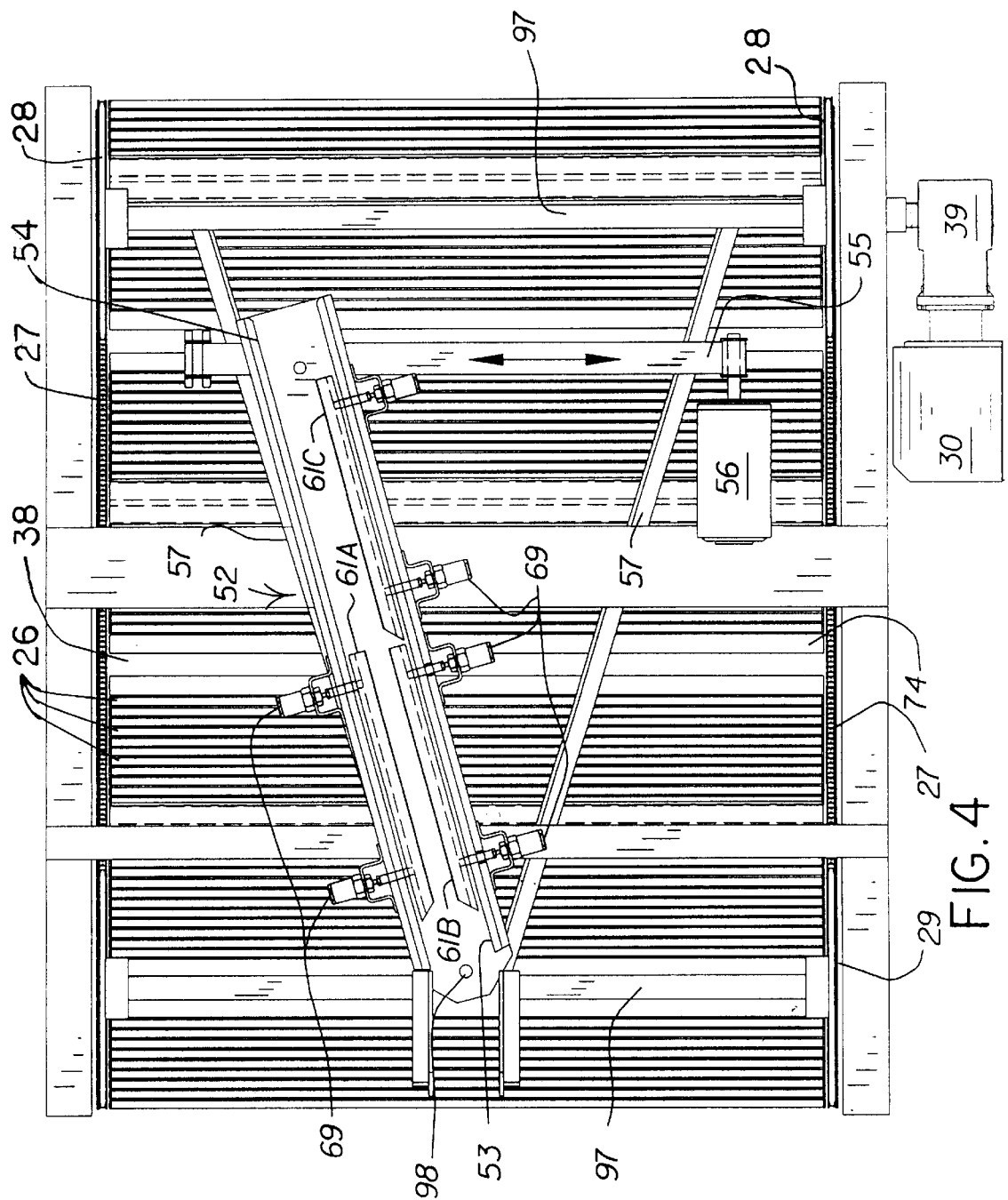
FIG. 4 is an enlarged fragmentary view of the embodiment of FIG. 2 with portions broken away.
Figure 5:
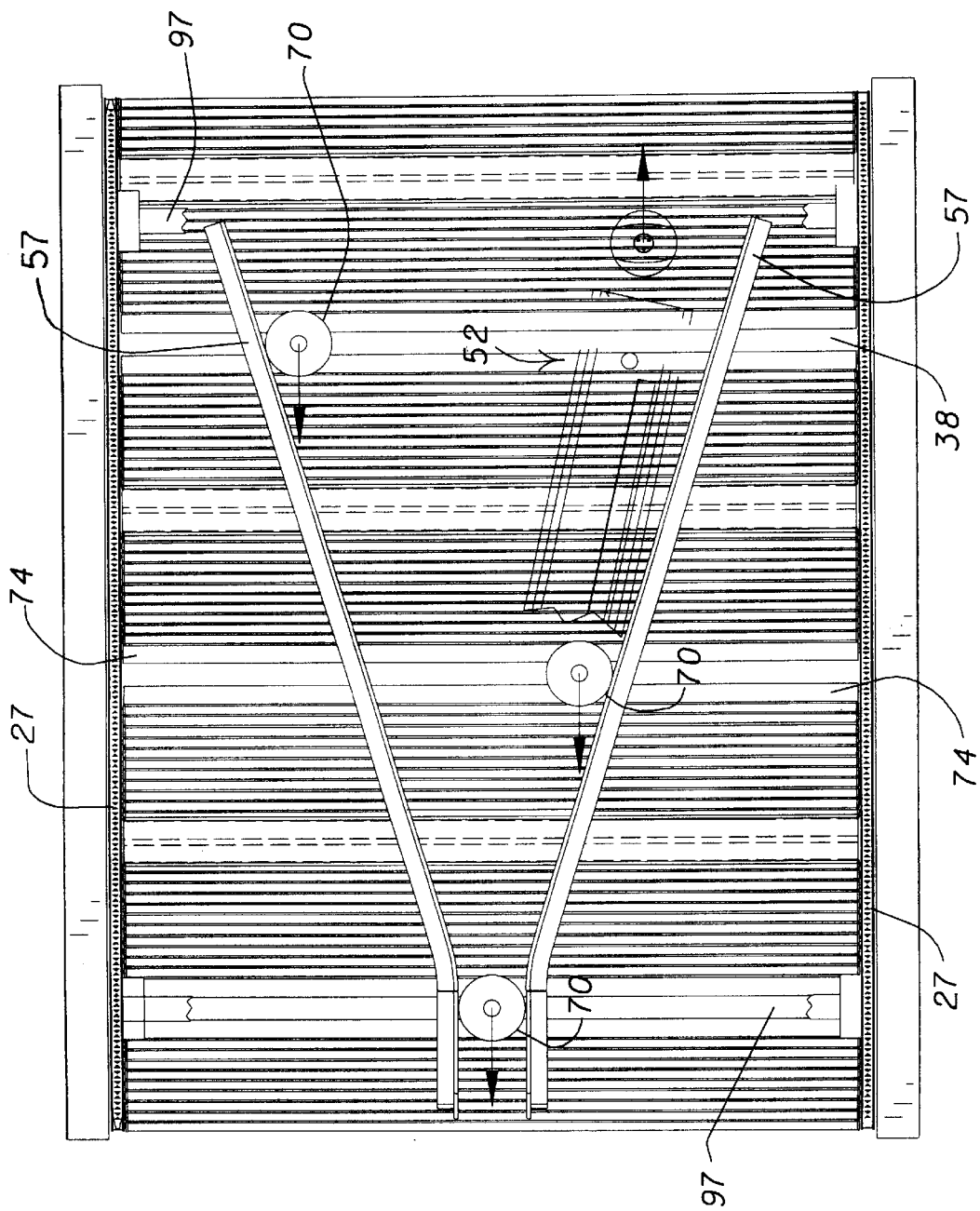
FIG. 5 is a bottom view of the embodiment of FIG. 4 with portions broken away.
Figure 6:
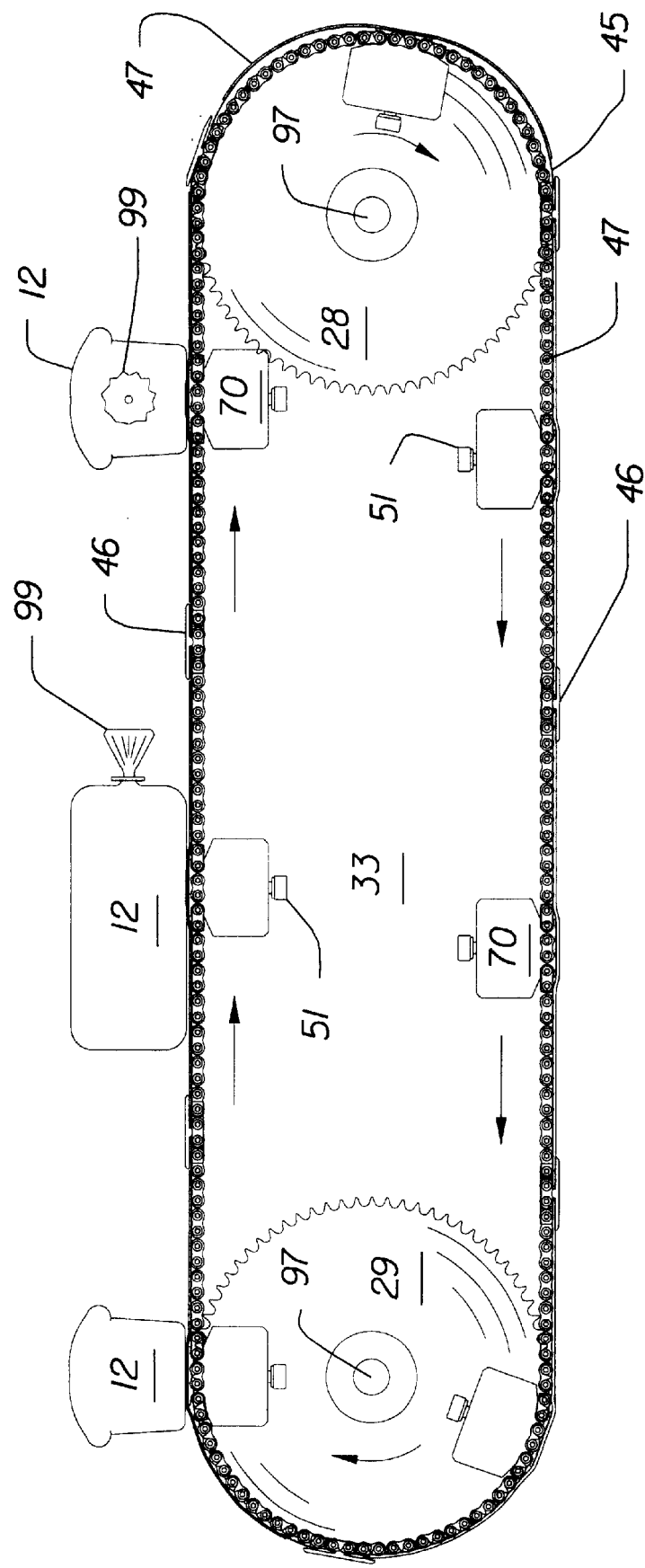
FIG. 6 is a schematic side view corresponding to FIG. 3.
Figure 7:
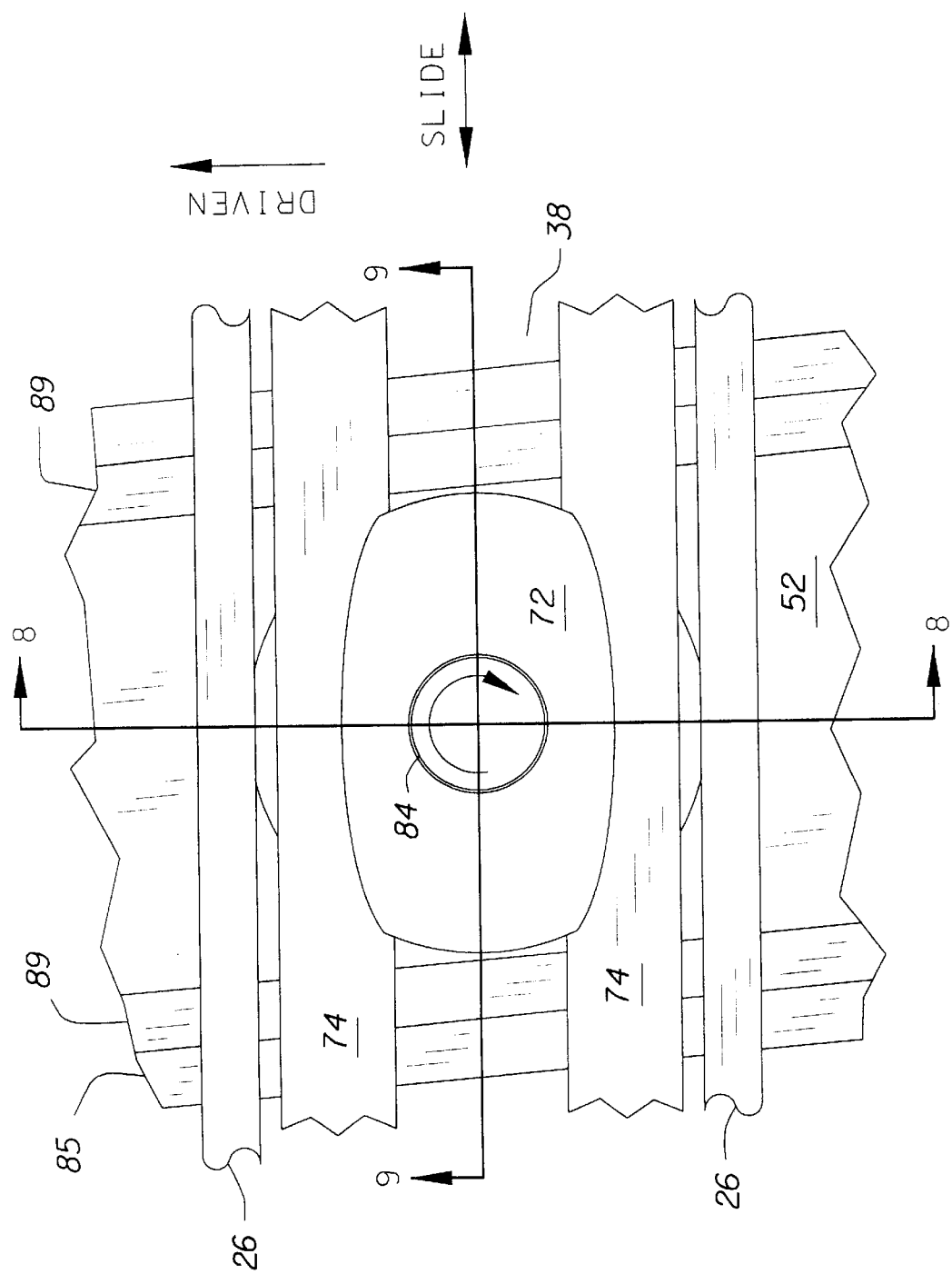
FIG. 7 is a fragmentary top view showing a turner assembly of the patterning apparatus.
Figure 8:
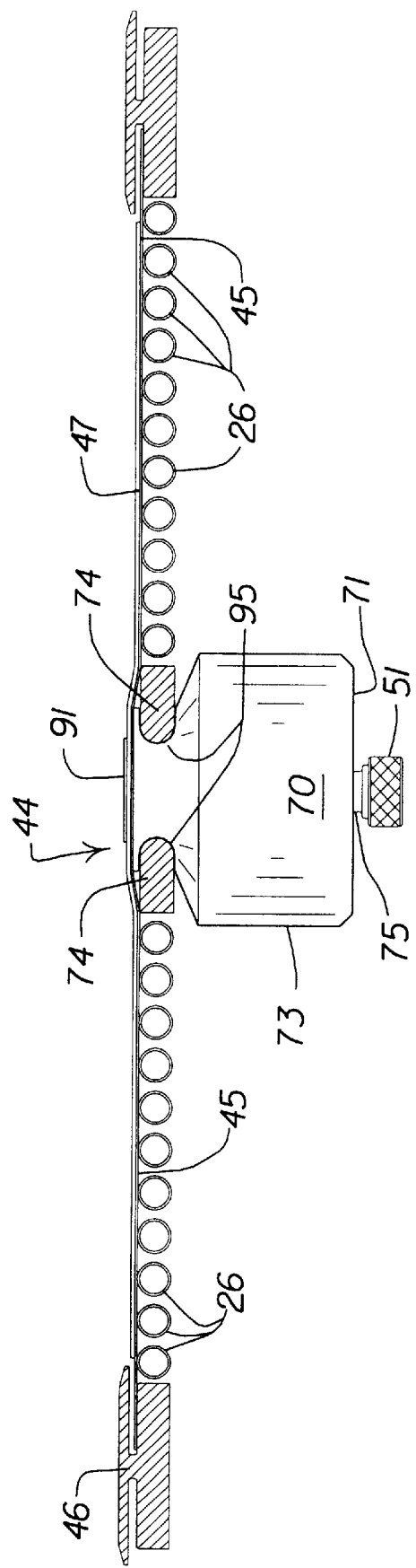
FIG. 8 is a partial sectional view taken in the direction of the arrows upon the line 8—8 of FIG. 7, with parts added.
Figure 9:
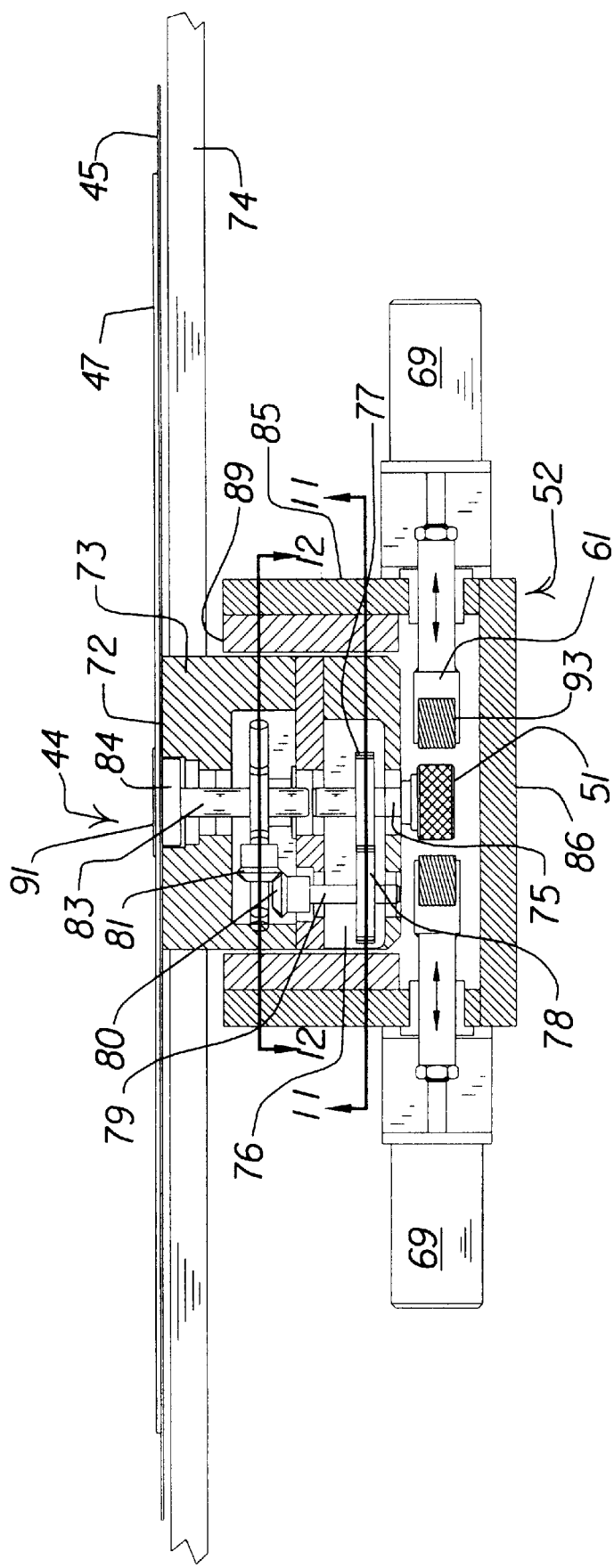
FIG. 9 is a sectional view taken in the direction of the arrows upon the line 9—9 of FIG. 7.
Figure 10:
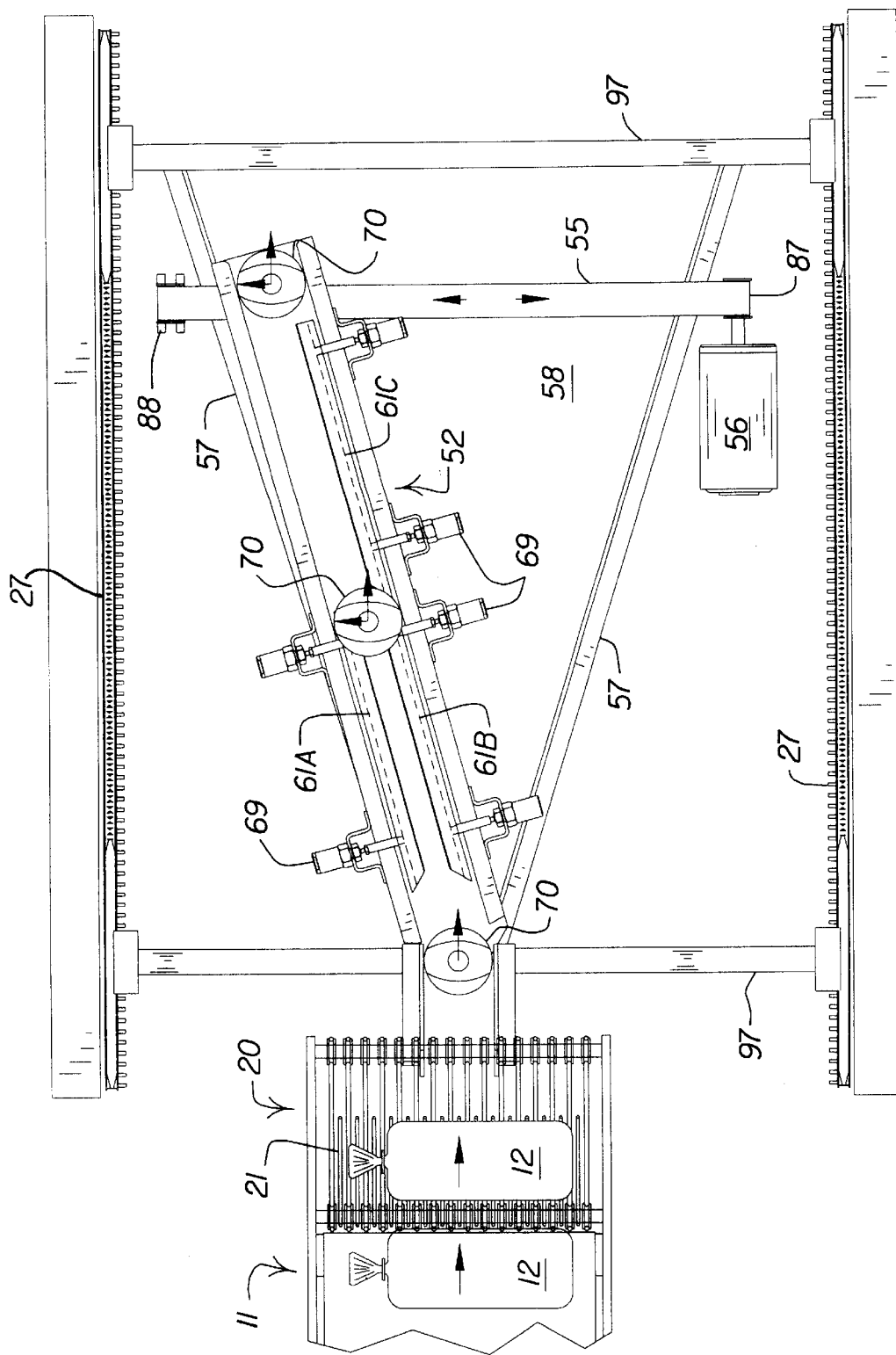
FIG. 10 is a top view similar to FIG. 4 but with further portions broken away, and schematically illustrating functionality.
Figure 12:
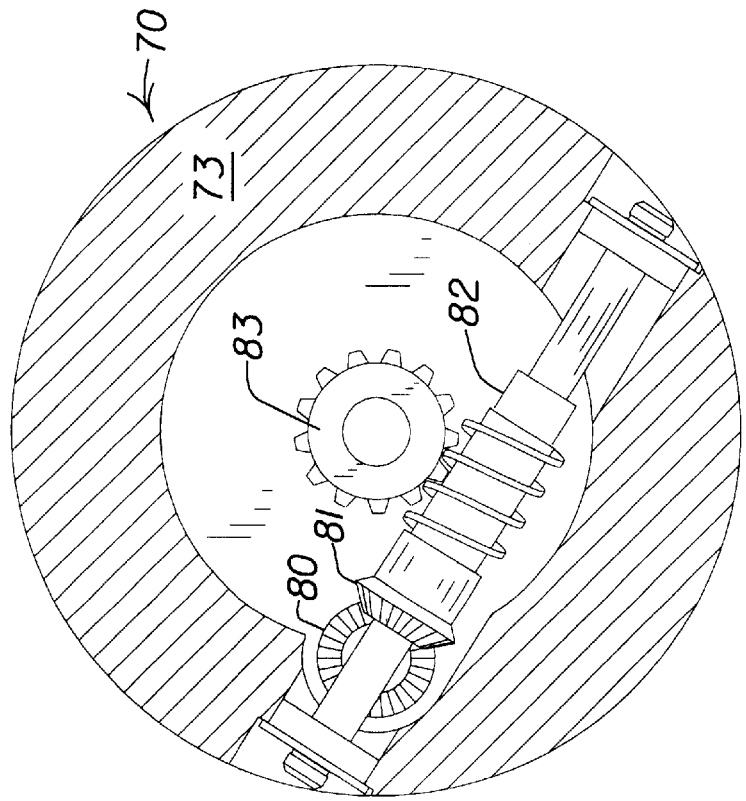
FIG. 12 is a sectional view taken in the direction of the arrows upon the line 12—12 of FIG. 9.
Figure 11:
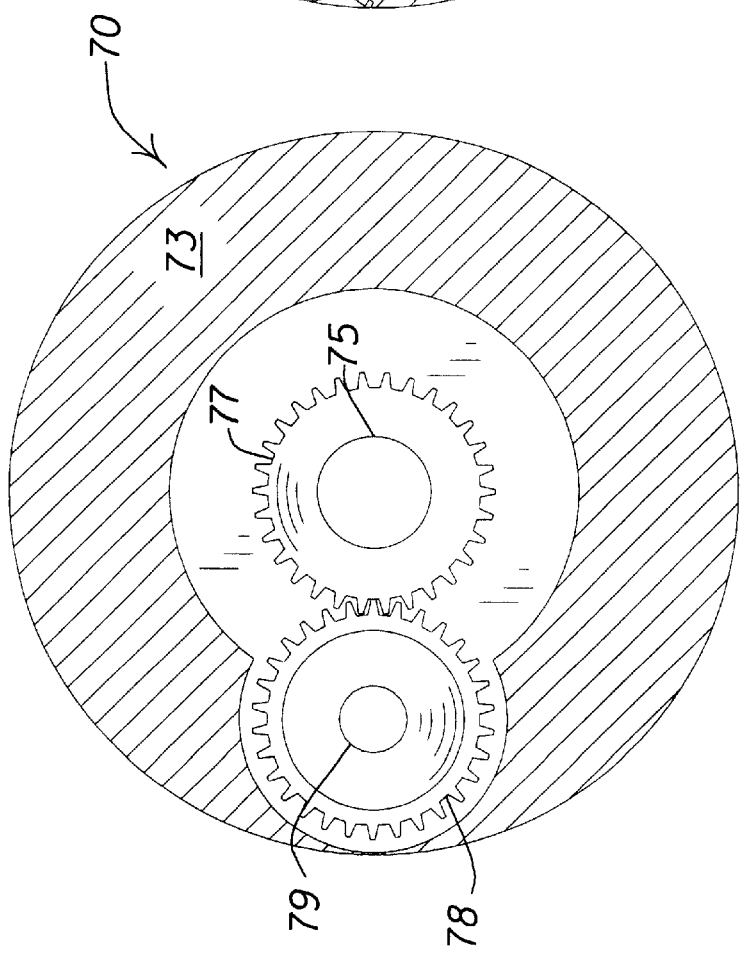
FIG. 11 is a sectional view taken in the direction of the arrows upon the line 11—11 of FIG. 9.
Figure 13:
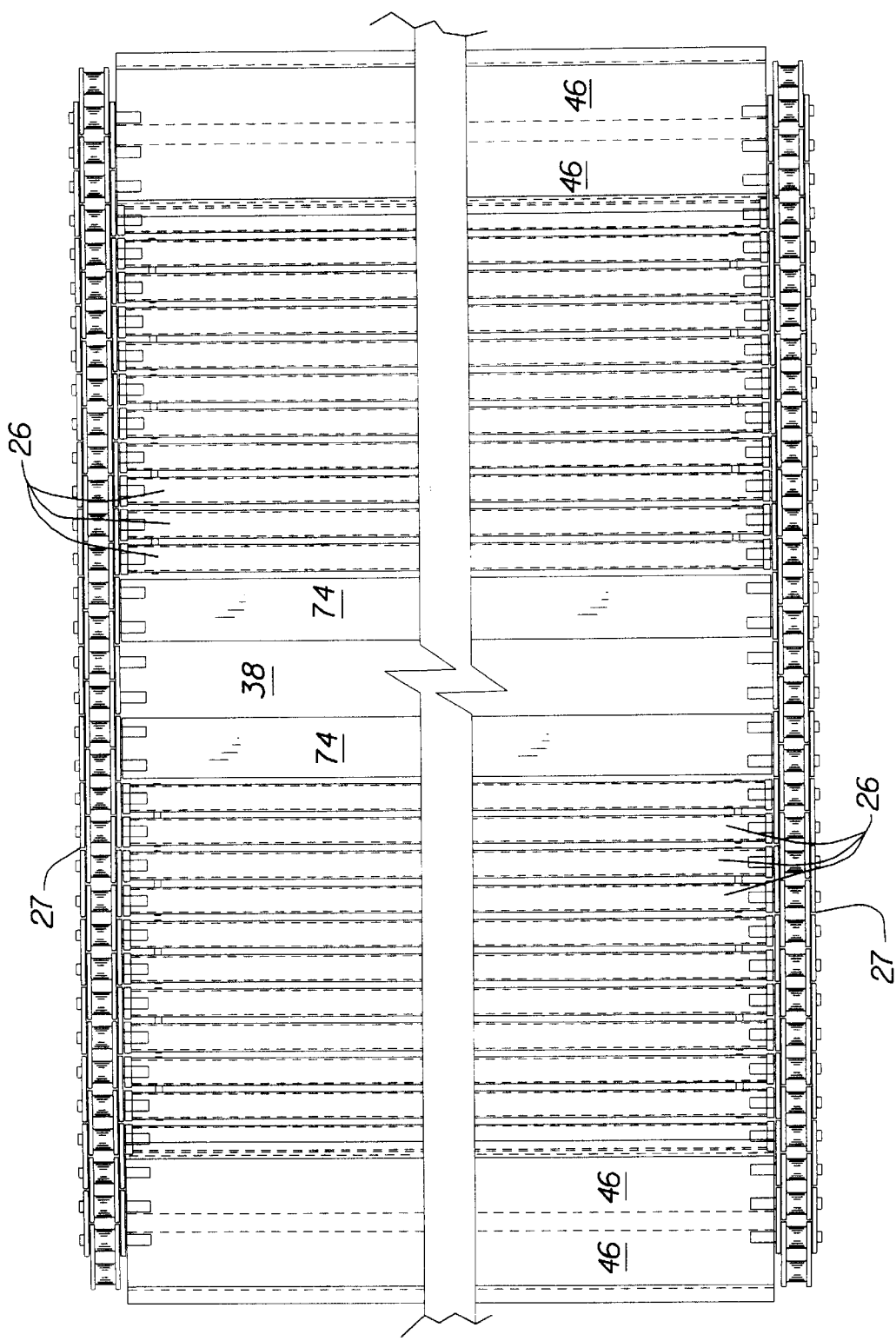
FIG. 13 is an enlarged fragmentary top plan view of the belt component of the apparatus of FIG. 3.
Figure 14:
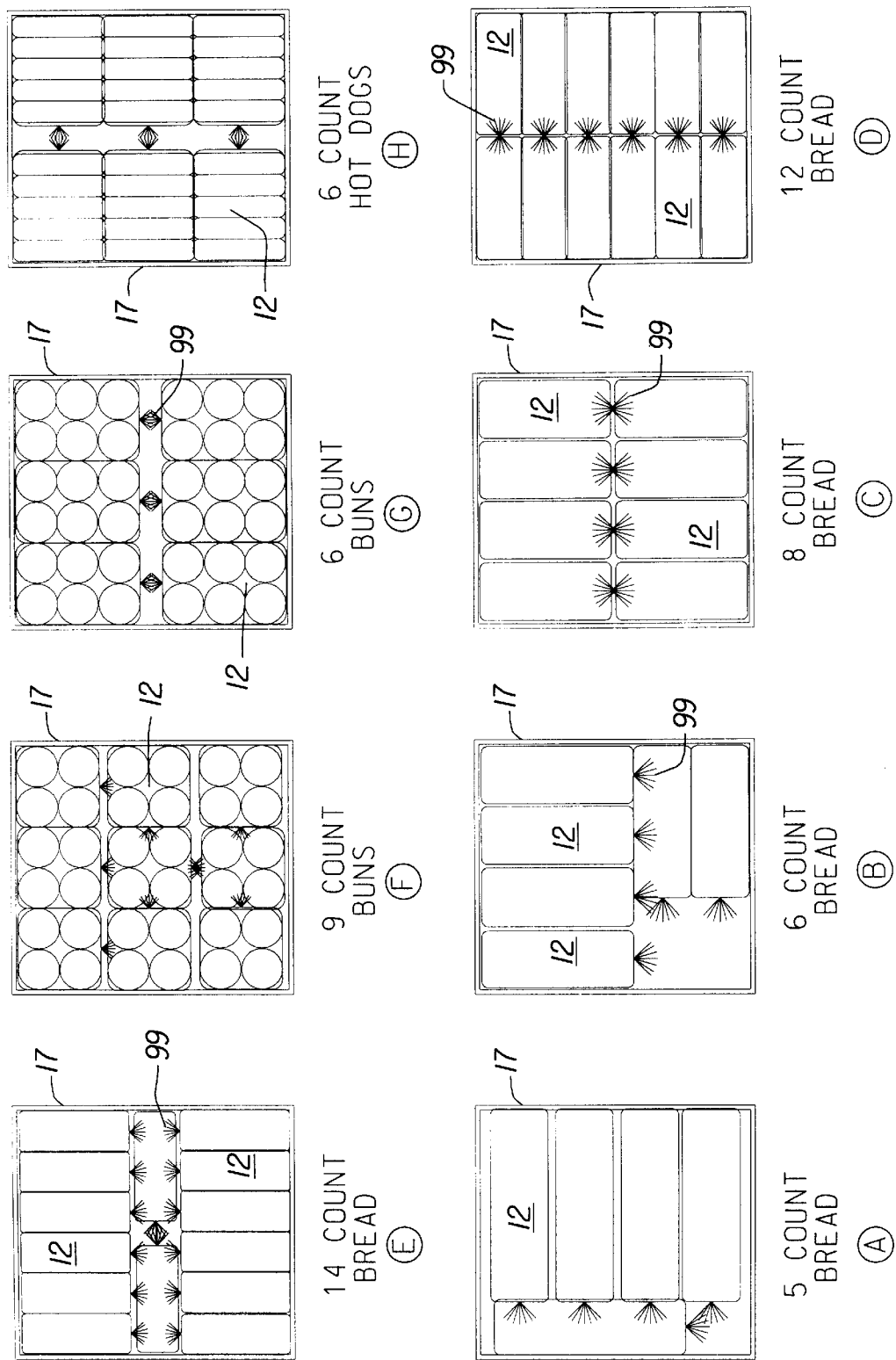
FIGS. 14A–H illustrate typical patterns of packaged bakery goods emplaced within shipping containers, with descriptive titles.

The expressions "upper" and "lower" and terms of equivalent import are employed herein for convenience of description, and are not intended to be limitative of the invention.

Referring now to FIGS. 1–13, an embodiment of the patterning apparatus 10 of the present invention is shown in functional association with infeed conveyor 11 that supplies a succession of packaged bakery goods 12 along a longitudinal path 13. Said packages are oriented and positioned by product orienter 14 and forwarded to staging deck 15 on which a predetermined pattern of packages is assembled. Said assemblage of packages is moved as a unit to a container loader 16 for loading into waiting containers 17. The infeed conveyor 11, the product orienter 14, the staging deck 15 and container loader 16 are all disposed in-line upon longitudinal center path or axis 13, along which said packages are transported.

Infeed conveyor 11 is of standard construction, comprised of endless belt 18 whose upper flight 19 moves in the direction of the arrow in FIG. 1 for transporting packages forwardly along said longitudinal path. A bridging conveyor 20 may be employed between infeed conveyor 18 and product orienter 14. Said bridging conveyor may be equipped with a control gate 21 adapted to move into and out of the path of packages to selectively space or time the packages before their transfer to said product orienter. For purposes of illustration, the packages 12 have been depicted as loaves of bread in plastic bags tied at one end to form a tail 99 in a well known manner. In the drawings, the loaves on said infeed conveyor are shown placed transversely to path 13 with the tails all oriented in the same direction. However, in other embodiments, the tails may be otherwise oriented.

Product orienter 14 includes a frame 22 comprised of a plurality of upright posts 23 interconnected by horizontal members 24. An endless belt 25 is positioned at the upper extremity of frame 22. Said belt is comprised of a multitude of parallel cross rods 26 orthogonally disposed to path 13 and secured at their lateral extremities to paired vertically disposed endless sprocket chains 27. Such arrangement further defines opposed lateral edges 37 of belt 25. Said sprocket chains engage paired forward and rearward sprocket wheels 28 and 29, respectively, mounted on axles 97 journaled to said frame. In the illustrated embodiment, said forward sprocket wheels are driven in a clockwise direction by motor 30 and associated speed controller 39, thereby forwardly advancing the upper flight 31 of belt 25. The lower, rearwardly moving flight 32 of belt 25 is spaced apart from said upper flight by the diameter of said sprocket wheels, thereby creating an a intervening zone 33 that contains equipment components which will be subsequently described. The diameter of said sprocket wheels, and the attendant height of zone 33 is preferably between 12 and 14 inches. Belt 25 may be further characterized in having an outer surface 34 and opposed interior surface 35 directed toward intervening zone 33. Rails supported by frame 22 may be disposed between corresponding forward and rearward sprocket wheels for slideably supporting chains 27.

A number of turner assemblies 36 are carried by belt 25 in a manner to slideably traverse between opposite edges 37 of said belt. Said turner assemblies include a rotator gearbox 70. As best shown in FIGS. 7–9 and 11–12, the rotator gearbox has an exterior configuration comprised of bottom extremity 71, upper extremity 72 and sidewall 73 disposed between said upper and lower extremities. Upper extremity 72 is provided with opposed receiving troughs 95 configured to slideably engage adjacent cross rods of said belt, particularly at gaps 38 in said belt where two or more cross rods have been deleted. Specialized heavy duty cross rods 74 may be employed within gap 38 for slideably receiving said gearbox by way of troughs 95. Said specialized cross rods 74 serve as tracks for the traversing movement of the turner assembly across belt 25.

Drive means in the form of a knurled circular input hub 51 protrudes downwardly from bottom extremity 71, and attaches to input shaft 75 that enters the interior 76 of gearbox 70. A first flat gear 77 is attached to shaft 75, and is interactive with second flat gear 78 attached to interior shaft 79. A first bevel gear 80 is positioned atop shaft 79, and is interactive with second level gear 81 attached to worm gear 82 journaled to sidewall 73 in orthogonal relationship to input shaft 75. Rotation of said worm gear produces controlled turning of output shaft 83 having attached securement plate 84 emergent from upper extremity 72 of gearbox 70.

In a preferred embodiment, gearbox 70 is constructed in a manner such that twenty revolutions of input shaft 75 produce one revolution of output shaft 83. Accordingly, five revolutions of said input shaft produce a 90 degree rotation of said output shaft.

Each turner assembly 36 is further comprised of platform means 44 attached to securement plate 84 by way of cap 91 consisting of a thin flat plastic disc bolted to plate 84 in a manner to sandwich there between said platform means. Platform means 44 is comprised in part of disc 45 fabricated of a durable engineering grade polymer such as a nylon polyamide, polycarbonate, polyacetal or polyester, and being sufficiently thin to be resilient. The thickness of disc 45 is preferably between 0.5 and 2.0 millimeters. The outer perimeter of disc 45 is slideably held beneath elongated brackets 46 coextensive with said cross rods on outer surface 34. The degree of resiliency of disc 45 should be such as to enable it to remain engaged by brackets 46 as the corresponding portion of belt 25 moves around said sprocket wheels.

A second component of platform means 44 is an upper layer 47 of a resilient material such as a closed cell sponge as defined by ASTM-D1056-99 Grade 2C2, and having a Shore A Hardness between 10 and 70. Upper layer 47 preferably has a coefficient of friction interactive with the packaged bakery item between 1.0 and 1.2, and is preferably bonded to disc 45 by use of adhesives or other means. Said coefficient of friction is the tangent of the angle to which a first object resting upon a second object can be tilted without sliding. In the case of a loaf of bread in a polyethylene bag resting upon upper layer 47, said angle is between 45 and 50 degrees, which provides a coefficient of 1.0–1.2. It has been found that, when said upper layer has the aforesaid properties, any package of bakery goods will be retained thereupon by gravity force alone despite translational and rotational movement of the package.

A straight swing track 52 elongated between upstream and downstream open extremities 53 and 54, respectively, is disposed within intervening zone 33 adjacent upper flight 31. Track 52 has an upwardly opening U-shaped configuration comprised of spaced apart vertical side panels 85 and connecting bottom panel 86. Upstream extremity 53 is pivotably secured at a site 98 above the axle of rearward sprocket wheels 29 to permit movement of track 52 in a horizontal plane. Low friction bearing plates 89 may be attached to the facing surfaces of side panels 85.

Downstream extremity 54 of track 52 is pivotably secured to transverse belt 55 interactive with laterally opposed drive spool 87 and follower spool 88. A computer-controlled servomotor 56 interactive with drive spool 87 produces reciprocating back and forth movement of belt 55, causing swinging movement of downstream extremity 54 of said track toward the lateral edges 37 of belt 25.

Upstream extremity 53 of track 52 is adapted to receive turner assemblies 36 by embracing the sidewalls 73 thereof as said assemblies are moved by belt 25 forwardly upon entering upper flight 31. As the turner assemblies 36 continue their forward travel, swinging movement of track assembly 52 causes said turner assemblies to exit at desired lateral locations on upper flight 31. Once exited from the track assembly, the released turner assemblies retain their positions with respect to the lateral edges of belt 25.

While said turner assemblies ride within track 52, elongated control bars 61, activated by pneumatic cylinders 69, are selectively caused to move to inward and outward positions with respect to the longitudinal center of the track. In the inward position, a rubber strip 93 attached to the forward extremity of bar 61 is brought into forceful contact with input hub 51. Such action produces rotation of hub 51, with consequent rotation of platform means 44. The length of the control bar and the diameter of hub 51 are matched so that 90 degrees of rotation are produced by each control bar 61. For example, if hub 51 has a diameter of one inch, five rotations of said hub will be produced by 15.7 inches of contact with rubber strip 93, and said five rotations, at a 20/1 ratio, cause platform means 44 to turn 90 degrees.

Three control bars 61 are associated with track 52, and are designated 61A, 61B and 61C. Bars 61A and 61B are in facing juxtaposition, and bar 61C is positioned further downstream. When it is desired to cause a turner assembly to rotate 90 degrees counterclockwise, bar 61A will be caused to contact hub 51. If a 90 degree clockwise rotation is sought, bar 61B will be pushed inwardly to contact hub 51. When a 180 degree rotation of the turner assembly is needed, bars 61B and 61C will sequentially interact with hub 51. As best shown by the arrows in FIG. 7, the turner assembly 36, while engaged by track 52, rotates and is advanced forwardly by the belt, as indicated by the "driven" arrow, and is caused to slide in a reciprocating lateral direction by virtue of the swinging motion of track 52, as indicated by the "slide" arrow. Such directions of motion are also shown by the arrows associated with gearboxes 70 in FIG. 10.

Two straight elongated stationary guide rails 57 are disposed within intervening zone 33 adjacent lower flight 32. Said guide rails are adapted to slideably contact the sidewall 73 of rotator gearboxes 70, and are convergent in the rearward direction, thereby defining a funnel-shaped area 58 adapted to gather said turner assemblies and return them to longitudinal path 13 upon the center line of belt 25. Said centered turner assemblies are then carried around rearward sprocket wheels 29, and enter track 52 associated with upper flight 31.

In the operation of the product orienter 14 of the present invention, packages are deposited by infeed conveyor 11 onto the resilient upper layer 47 of the platform means of sequential turner assemblies. A programmable computer controls the operation of pneumatic cylinders 69 to achieve desired rotational orientation of each package, and a computer interactive with servomotor 56 simultaneously causes traversing movement of track 52 to achieve desired lateral position of the package. The positioned packages are transferred from upper flight 31 onto staging deck 15 having a bed of free-rolling rollers 60 which enables the packages to be assembled into a predetermined pattern. The assemblage of packages is then transferred to shipping containers 64. Typical patterns of said assemblages are shown in FIGS. 15A–H.

In view of the aforesaid specialized components and their interaction, the patterning apparatus is capable of high speed operation while producing any pattern configuration. Throughput speeds of up to 120 packages per minute are achievable. By way of comparison, patterning apparatus of the prior art has generally been capable of not more than about 90 packages per minute.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A patterning apparatus for arranging packaged bakery goods for placement into shipping containers, said apparatus comprising:
    a) a product orienter comprised of:
        1) conveyor means having a horizontally disposed surface for transporting packages of bakery goods in a longitudinal direction from an entrance site to a discharge site,
        2) a series of turner assemblies attached to and moving with said conveyor means for rotating said packages in a horizontal plane while being transported, and
        3) means for causing displacement of said turner assemblies laterally with respect to said longitudinal direction during said transport, and
    b) a staging deck which receives oriented packages from said product orienter and assembles them into a predetermined pattern.

2. The apparatus of claim 1 wherein said turner assemblies include platform means capable of retaining by gravity effect a packaged bakery product resting thereupon.

3. The apparatus of claim 2 wherein said platform means is comprised of an upper layer of a resilient material and a lower layer fabricated of an engineering grade polymer in a sufficiently thin sheet configuration to impart flexibility to said lower layer.

4. The apparatus of claim 3 wherein said resilient material is a closed cell sponge rubber as defined.in ASTM-D-1056-99, grade 2C2.

5. The apparatus of claim 3 wherein said resilient material has a coefficient of friction interactive with said packaged bakery goods of between 1.0 and 1.2.

6. The apparatus of claim 3 wherein said engineering grade polymer is a nylon.

7. The apparatus of claim 3 wherein said upper layer is bonded to said lower layer.

8. The apparatus of claim 1 wherein said conveyor means is an endless belt having-a longitudinal center axis.

9. The apparatus of claim 8 wherein the horizontally disposed surface of said endless belt extends between opposed lateral edges, each defined by a vertically disposed endless sprocket chain.

10. The apparatus of claim 9 wherein said sprocket chains engage forward and rearward sprocket wheels.

11. The apparatus of claim 10 wherein said belt is arranged to have a forwardly moving upper flight and a rearwardly moving lower flight.

12. The apparatus of claim 11 wherein said upper and lower flights are spaced apart by a distance substantially equal to the diameter of said sprocket wheels, thereby creating an intervening zone which accommodates components of equipment.

13. The apparatus of claim 12 wherein each turner assembly further includes a gearbox having upwardly emergent rotatable securement means and downwardly directed drive means.

14. The apparatus of claim 13 wherein a platform means is attached to said securement means.

15. The apparatus of claim 14 further including a straight swing track elongated between upstream and downstream open extremities and configured to slideably embrace the gearbox of said turner assemblies.

16. The apparatus of claim 15 wherein said swing track includes at least three elongated control bars adapted to selectively contact said drive means to produce rotation of said securement means in increments of 90 and 180 degrees of angle.

17. The apparatus of claim 16 wherein means are provided to achieve reciprocating pivotal movement of the downstream extremity of said swing track in a horizontal plane within said intervening zone.

18. The apparatus of claim 14 further provided with two elongated guide rails disposed within said intervening zone beneath said swing track to slideably convey said turner assemblies back to said longitudinal center axis of said belt.

19. The apparatus of claim 16 wherein said control bars are urged into selective contact with said drive means by way of pneumatic cylinders associated with said swing track.

20. The apparatus of claim 17 wherein said means for achieving said reciprocating pivotal movement includes a computer-controlled servomotor.

* * * * *